US012784701B2

(12) United States Patent
Zhang et al.

(10) Patent No.: US 12,784,701 B2
(45) Date of Patent: Nov. 3, 2026

(54) OLED ANTI-AGING REGIONAL COMPENSATION

(71) Applicant: QUALCOMM Incorporated, San Diego, CA (US)

(72) Inventors: Nan Zhang, Beijing (CN); Xinchao Yang, Shanghai (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/103,211

(22) PCT Filed: Sep. 15, 2022

(86) PCT No.: PCT/CN2022/118997
§ 371 (c)(1),
(2) Date: Feb. 11, 2025

(87) PCT Pub. No.: WO2024/055234
PCT Pub. Date: Mar. 21, 2024

(65) Prior Publication Data

US 2026/0057851 A1 Feb. 26, 2026

(51) Int. Cl.
*G09G 3/34* (2006.01)
*G09G 3/3225* (2016.01)
*G09G 5/36* (2006.01)

(52) U.S. Cl.
CPC ........... *G09G 3/342* (2013.01); *G09G 3/3225* (2013.01); *G09G 5/363* (2013.01);
(Continued)

(58) Field of Classification Search
CPC ...... G09G 3/342; G09G 3/3225; G09G 5/363; G09G 2320/046; G09G 2320/048;
(Continued)

(56) References Cited

U.S. PATENT DOCUMENTS

2005/0110807 A1 5/2005 Chang
2012/0133835 A1* 5/2012 Van Heesch ............. G09G 5/00
348/576

(Continued)

FOREIGN PATENT DOCUMENTS

CN 114093323 A 2/2022
WO 2021043143 A1 3/2021

OTHER PUBLICATIONS

International Search Report and Written Opinion—PCT/CN2022/118997—ISA/CN—Apr. 21, 2023.

*Primary Examiner* — Richard J Hong
(74) *Attorney, Agent, or Firm* — Procopio, Cory, Hargreaves & Savitch LLP

(57) ABSTRACT

Aspects presented herein relate to methods and devices for display processing including an apparatus, e.g., a CPU. The apparatus may obtain an indication of at least one frame including a set of pixels, where the at least one frame is associated with at least one layer. The apparatus may also detect a first subset of pixels in the set of pixels included in the at least one frame, where each of the first subset of pixels includes a decay ratio that is less than a decay ratio threshold. Further, the apparatus may identify one or more regions of the at least one frame that include all of the first subset of pixels. The apparatus may also increase a brightness value of each of the first subset of pixels or decrease a brightness value of each of a second subset of pixels.

20 Claims, 11 Drawing Sheets

(52) U.S. Cl.
CPC . *G09G 2320/046* (2013.01); *G09G 2320/048* (2013.01); *G09G 2320/0626* (2013.01); *G09G 2360/18* (2013.01)

(58) Field of Classification Search
CPC ....... G09G 2320/0626; G09G 2360/18; G09G 3/20; G09G 5/10; G09G 5/001; G09G 3/3611; G09G 5/00; G09G 3/22; G09G 3/006; G06F 3/0673; G06F 21/575
See application file for complete search history.

(56) References Cited

U.S. PATENT DOCUMENTS

| | | | | |
|---|---|---|---|---|
| 2014/0089682 | A1* | 3/2014 | Gulati | G06F 21/575 713/192 |
| 2016/0212362 | A1 | 7/2016 | Pang et al. | |
| 2016/0293102 | A1* | 10/2016 | Chaji | G09G 3/20 |
| 2016/0335965 | A1* | 11/2016 | Huang | G09G 3/3611 |
| 2018/0350295 | A1* | 12/2018 | Drzaic | G09G 3/006 |
| 2018/0350296 | A1* | 12/2018 | Thompson | G06F 3/0673 |
| 2019/0080666 | A1* | 3/2019 | Chappalli | G09G 3/22 |
| 2021/0183334 | A1* | 6/2021 | Holland | G09G 5/001 |
| 2022/0093059 | A1* | 3/2022 | Yang | G09G 5/10 |

* cited by examiner

OLED ANTI-AGING REGIONAL COMPENSATION

CROSS-REFERENCE TO RELATED APPLICATION

This application is a 371 National Stage of PCT Application No. PCT/CN2022/118997, filed on Sep. 15, 2022, entitled "OLED ANTI-AGING REGIONAL COMPENSATION," and assigned to the assignee hereof. The disclosure of the prior Application is considered part of and is incorporated by reference into this Patent Application.

TECHNICAL FIELD

The present disclosure relates generally to processing systems and, more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a display processing unit (DPU), a graphics processing unit (GPU), or any apparatus that may perform display processing. The apparatus may obtain an indication of at least one frame associated with the display processing, where the at least one frame includes a set of pixels, where the at least one frame is associated with at least one layer. The apparatus may also detect a first subset of pixels in the set of pixels included in the at least one frame, where each of the first subset of pixels includes a decay ratio that is less than a decay ratio threshold. Additionally, the apparatus may mark each of the first subset of pixels in the set of pixels, where each of the first subset of pixels includes the decay ratio that is less than the decay ratio threshold. The apparatus may also identify one or more regions of the at least one frame that include all of the first subset of pixels. Moreover, the apparatus may calculate a set of coordinates for each of the one or more regions of the at least one frame that include all of the first subset of pixels. The apparatus may also analyze a plurality of windows in the at least one frame based on the set of coordinates for each of the one or more regions of the at least one frame that include all of the first subset of pixels. The apparatus may also determine that the one or more regions correspond to an entire area of the at least one frame. Further, the apparatus may refrain from increasing the brightness value of each of the first subset of pixels and refrain from decreasing the brightness value of each of the second subset of pixels based on the one or more regions corresponding to the entire area of the at least one frame. The apparatus may also increase a brightness value of each of the first subset of pixels in the one or more regions or decrease a brightness value of each of a second subset of pixels in the one or more regions, where each of the second subset of pixels is not included in the first subset of pixels. The apparatus may also transmit a second indication of the increased brightness value of each of the first subset of pixels in the one or more regions or the decreased brightness value of each of the second subset of pixels in the one or more regions.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
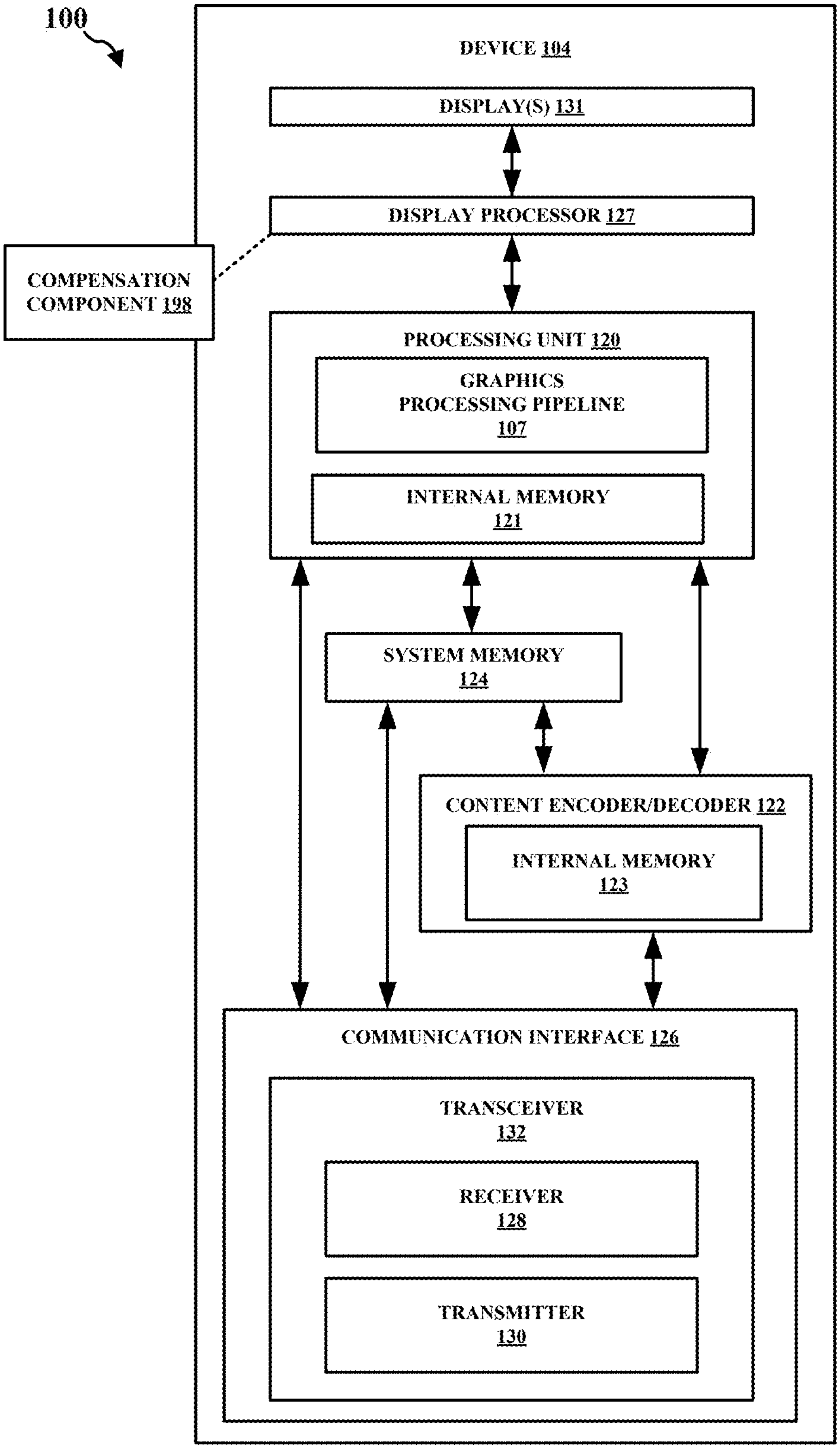
FIG. 1 is a block diagram that illustrates an example content generation system.

Some types of display devices (e.g., mobile devices, computers, TVs, or other consumer devices) may utilize certain types of light emitting diodes (LEDs) in a display (e.g., organic light emitting diodes (OLEDs)). Some types of LEDs (e.g., OLEDs) may have burn-in issues (i.e., pixels retaining a consistently incorrect color due to a prolonged exposure to a certain color) if displaying static bright pixels for some time. For example, static logos, icons, user interface (UI), system UI, and browsers are current key contributors to OLED pixel burn-in. Also, there are a number of current industry anti-burn-in or anti-aging solutions. For instance, anti-burn-in or anti-aging solutions (i.e., solutions for physically decayed pixel/sub-pixels) may randomly shift a few pixels (e.g., 1 or 2 pixels) of those image bright objects during run-time. This may be applicable to certain pixels (e.g., pixels for limited system UI small icons). Additionally, anti-burn-in or anti-aging solutions may record display pixels on-time, compute a decaying factor, and/or apply run-time pixel compensation. This solution may be applicable to all applications and correspond to an improved visual quality. Further, this solution may need a complex run-time compensation/calibration mechanism to balance a display panel visual quality, device power/performance, and anti-burn-in efficiencies. Accordingly, OLED anti-aging is an important issue in the display industry, which may utilize complex run-time compensation. As indicated herein, there may be a number of issues with pixel luminance performance at display devices. In order to compensate the physically decayed pixel/sub-pixels, there may be several solutions. For example, the pixels with a low luminance due to decay, or pixels with a fast or high decay rate (i.e., "bad" pixels) may have their luminance boosted. However, this solution may not work for white or bright content images, as certain luminance values (e.g., 255 luminance) may not be able to be boosted to a larger value. This solution may also attenuate all other decent frame pixel luminance to match bad pixels. In some instances, the brightness for pixels with a slow or low decay rate (i.e., "good" pixels) may be attenuated, which means that the panel maximum brightness may be reduced to the "bad" pixel luminance level. Additionally, in some aspects, the attenuation/reduction of a maximum luminance for pixels in anti-aging solutions may be determined based on the worst decayed pixels. Further, the worse the decaying of the "bad" pixels, the lower the display panel maximum luminance. The display panel maximum luminance may also be a key performance indicator (KPI) and may be important to end users. Moreover, reducing a panel maximum luminance may be a strong limitation to current OLED anti-aging solutions. As such, a panel maximum brightness may be reduced by global anti-aging in order to attenuate "good" pixel values to match "bad" pixels within a frame. Aspects of the present disclosure may utilize a regional anti-burn-in or anti-aging solution. That is, aspects presented herein may make regional adjustments to the luminance of different pixels within certain areas of a frame. For instance, aspects of the present disclosure may utilize a regional anti-aging or anti-burn-in solution for pixels with a fast or high decay rate (i.e., bad pixels). For example, aspects of the present disclosure may increase the luminance of pixels with a fast or high decay rate. Further, aspects presented herein may attenuate or reduce the luminance of pixels with a slow or low decay rate (i.e., good pixels) to match bad pixels within a local region. In some instances, aspects presented herein may avoid a panel maximum brightness being reduced by pixels with a faster or higher decay rate (i.e., bad pixels) compared to pixels with a slower or lower decay rate (i.e., good pixels). Aspects presented herein may also increase a panel maximum brightness and an average brightness while the anti-aging solution is applied. Further, aspects presented herein may utilize a bad pixel-of-interest basis compensation, which may be more robust for varying decay factors (e.g., real physical panel decay factors) compared with an all-pixel basis solution.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a compensation component 198 configured to obtain an indication of at least one frame associated with the display processing, where the at least one frame includes a set of pixels, where the at least one frame is associated with at least one layer. The compensation component 198 may also be configured to detect a first subset of pixels in the set of pixels included in the at least one frame, where each of the first subset of pixels includes a decay ratio that is less than a decay ratio threshold. The compensation component 198 may also be configured to mark each of the first subset of pixels in the set of pixels, where each of the first subset of pixels includes the decay ratio that is less than the decay ratio threshold. The compensation component 198 may also be configured to identify one or more regions of the at least one frame that include all of the first subset of pixels. The compensation component

198 may also be configured to calculate a set of coordinates for each of the one or more regions of the at least one frame that include all of the first subset of pixels. The compensation component 198 may also be configured to analyze a plurality of windows in the at least one frame based on the set of coordinates for each of the one or more regions of the at least one frame that include all of the first subset of pixels. The compensation component 198 may also be configured to determine that the one or more regions correspond to an entire area of the at least one frame. The compensation component 198 may also be configured to refrain from increasing the brightness value of each of the first subset of pixels and refrain from decreasing the brightness value of each of the second subset of pixels based on the one or more regions corresponding to the entire area of the at least one frame. The compensation component 198 may also be configured to increase a brightness value of each of the first subset of pixels in the one or more regions or decrease a brightness value of each of a second subset of pixels in the one or more regions, where each of the second subset of pixels is not included in the first subset of pixels. The compensation component 198 may also be configured to transmit a second indication of the increased brightness value of each of the first subset of pixels in the one or more regions or the decreased brightness value of each of the second subset of pixels in the one or more regions. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
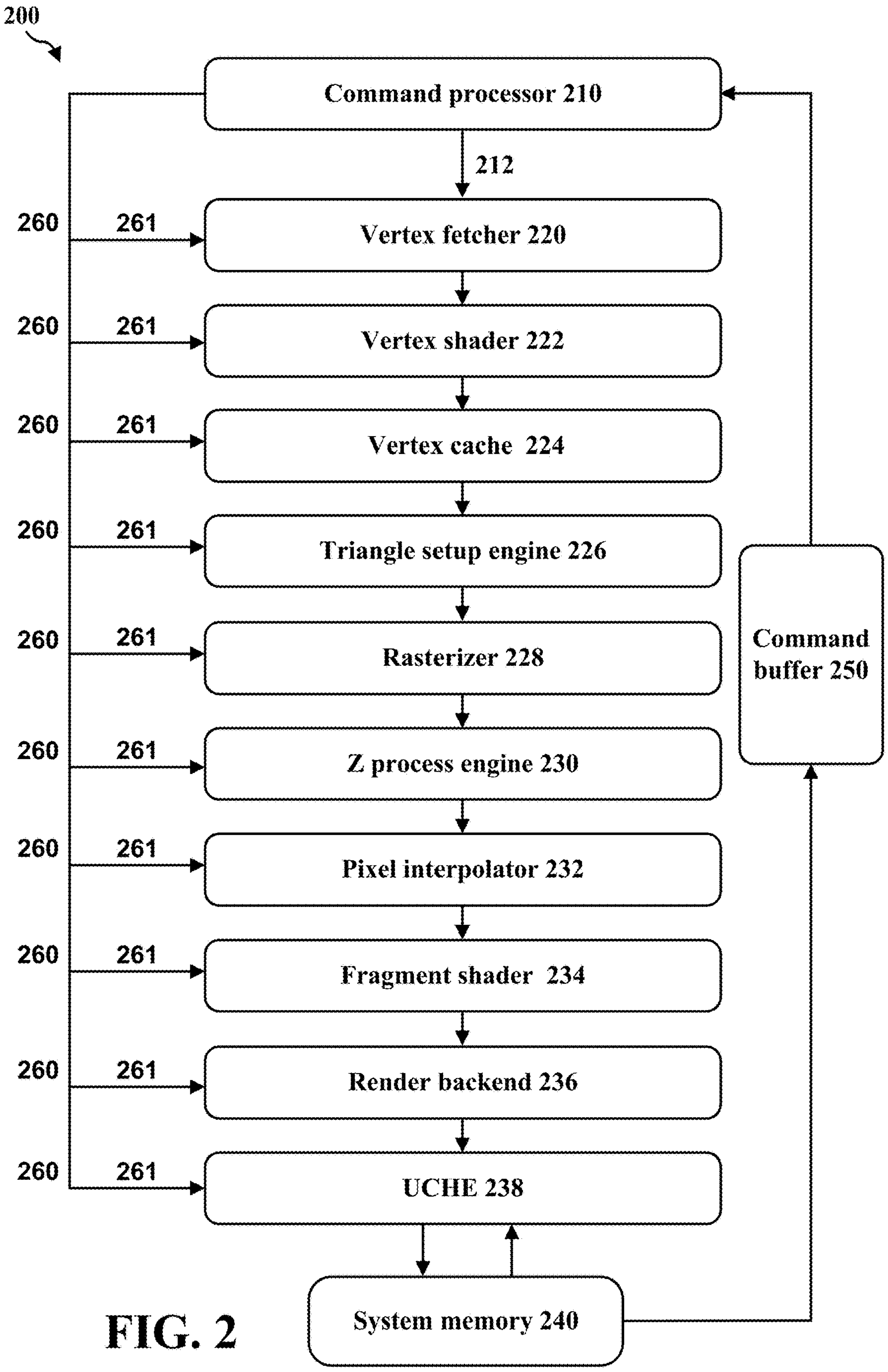
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUS according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
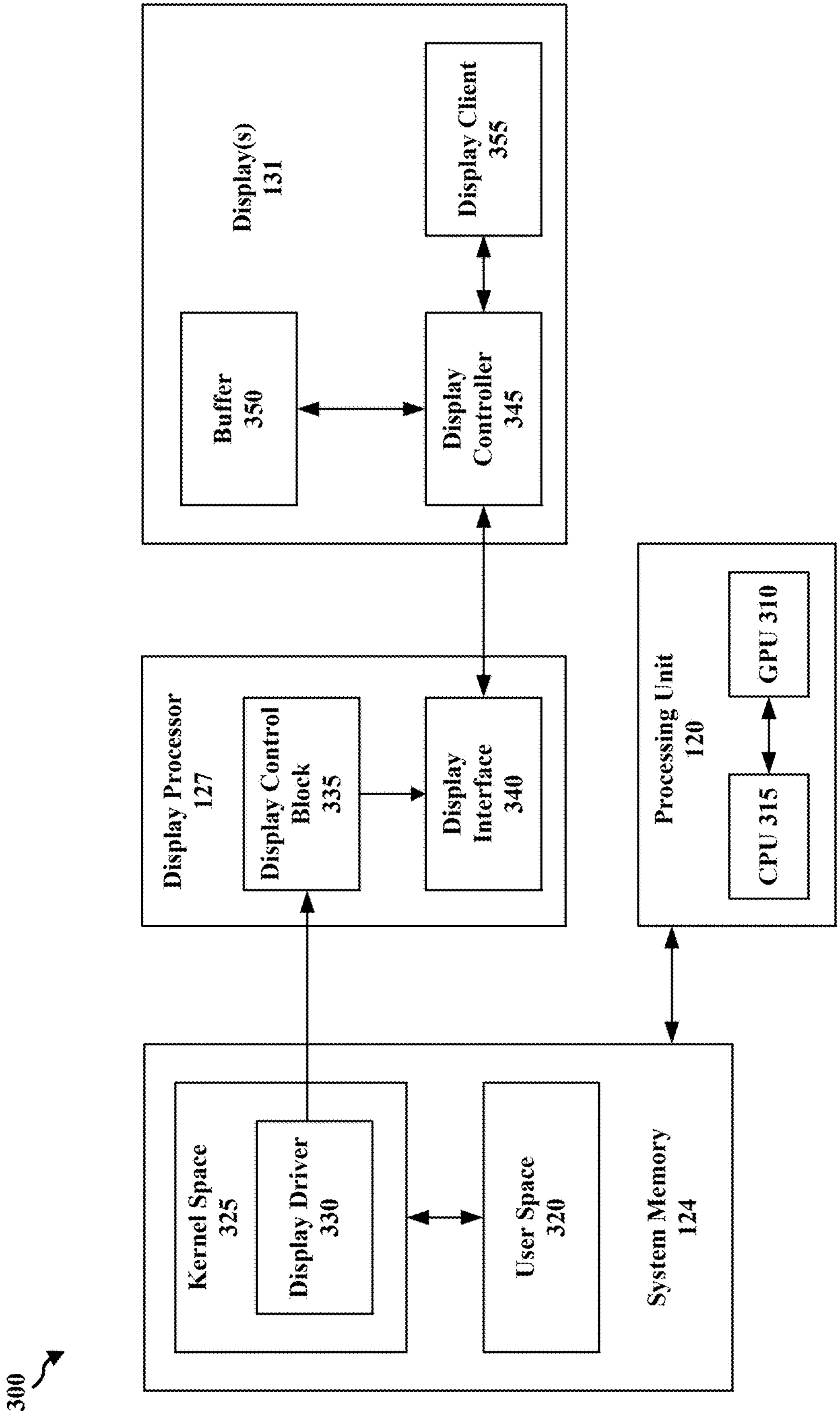
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
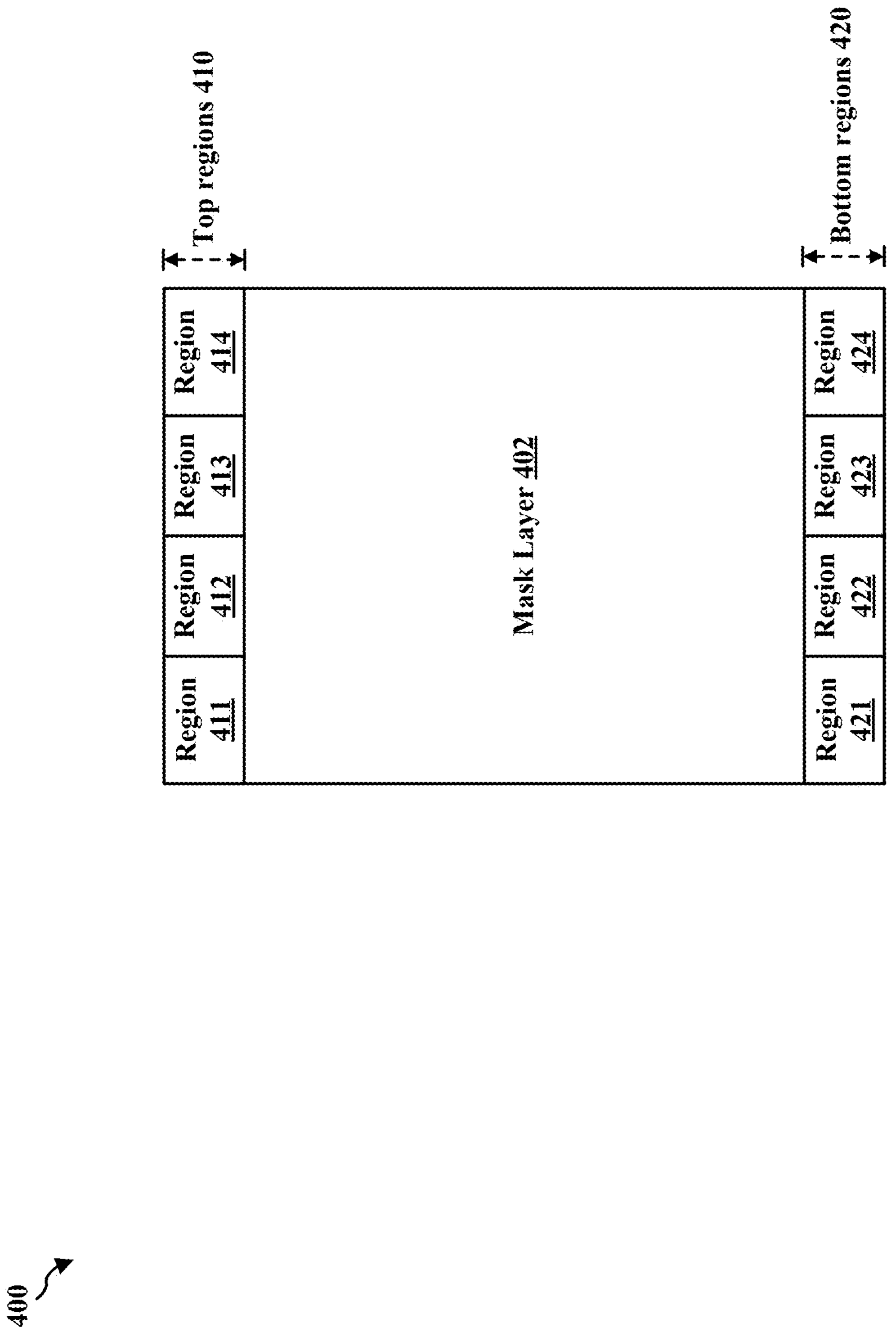
FIG. 4 is a diagram illustrating an example mask layer for display processing.

FIG. 4 is a diagram 400 illustrating an example mask layer for display processing. More specifically, diagram 400 depicts one type of mask layer that may represent portions of a display panel. As shown in FIG. 4, diagram 400 includes mask layer 402 including top regions 410 and bottom regions 420. Top regions 410 include region 411, region 412, region 413, and region 414, and bottom regions 420 include region 421, region 422, region 423, and region 424. As depicted in FIG. 4, mask layer 402 may represent the different regions that are displayed on a display panel.

Some types of displays may use a certain type of mask layer (e.g., a shape mask layer) to reshape a display frame. For instance, a mask layer may reshape the display frame to provide more optimized visual shapes at the display panel (e.g., improved round corners, improved circular shape, improved rectangular shape, etc.). These types of mask layers (e.g., shape mask layers) may be processed by software (e.g., graphics processing unit (GPU) software or central processing unit (CPU) software) or by hardware (e.g., display processing unit (DPU) hardware). Also, these mask layers may be processed by other specific types of hardware logic modules (e.g., modules in a display driver integrated circuit (DDIC) or bridge chips). In some aspects, these types of mask layers (e.g., shape mask layers) may be based on certain unit, such as a pixel. That is, the shape generation basis unit of the shape mask layers may be a single pixel.

Some aspects of display processing may utilize frame buffers to cache or store a composition output of a GPU. For instance, display layers may be cached or stored in a frame buffer after composition at a GPU. In some aspects, a composition hardware (HW) or software (SW) stack may use a frame buffer target to cache a composition output (e.g., a GPU composition output or a CPU composition output). The cached composition output may then be sent to another processor (e.g., a DPU) as an input layer. The frame buffer may have a number of different color formats, such as a red (R) green (G) blue (B) alpha (A) (RGBA) format (e.g., RGBA8888 format). Also, the frame buffer may be a certain size, (e.g., a 32-bit triple buffer). For example, at the beginning of a display/graphics subsystem design, a frame buffer may be created as an RGBA8888 format and a 32-bit triple buffer. In some instances, if the frame layers do not use a certain composition (e.g., a GPU or client composition), the frame buffers may be ignored. Also, the layers (e.g., frame layers or display layers associated with display processing) may be directly fetched and composed. For instance, a DPU or hardware composer may directly fetch the layers and then compose the layers.

Figure 5:
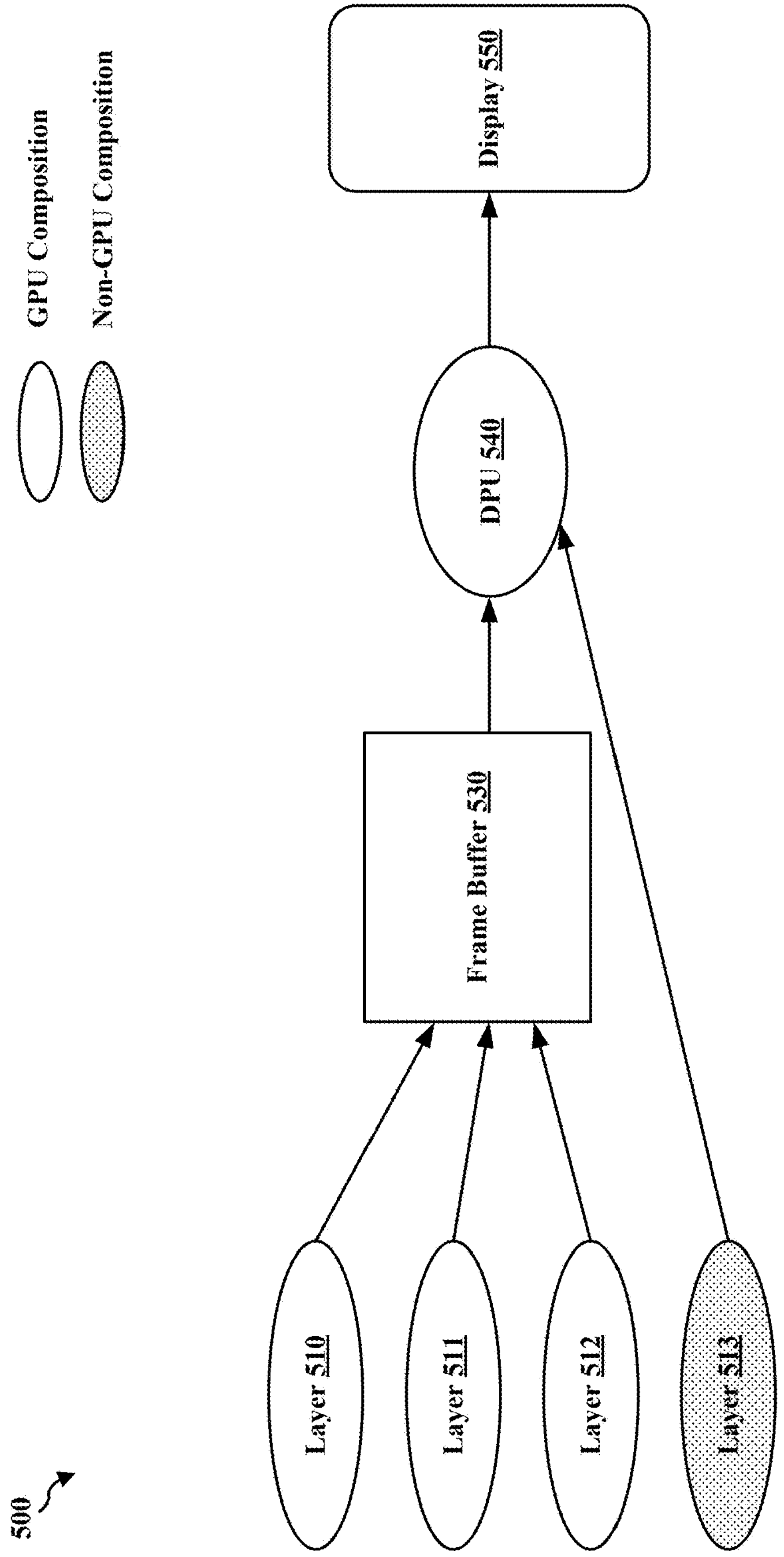
FIG. 5 is a diagram illustrating an example layer composition scheme for display processing.

FIG. 5 is a diagram 500 illustrating an example of a layer composition scheme for display processing. More specifically, diagram 500 depicts a layer composition of display layers where certain layers (e.g., layers of a certain composition) are cached in a frame buffer, and some layers are directly fetched and composed by a DPU. As shown in FIG. 5, diagram 500 includes layer 510, layer 511, layer 512, layer 513, frame buffer 530 (e.g., an RGBA8888 format frame buffer), DPU 540, and display 550. FIG. 5 depicts that layers composed at a GPU (i.e., layers associated with GPU composition) may be cached or stored in a frame buffer. For example, layer 510, layer 511, and layer 512 may be composed at a GPU and then cached/stored at frame buffer 530. Alternatively, layers that are not composed at a GPU (i.e., layers associated with non-GPU composition) may be directly fetched and composed at a DPU. For instance, layer 513 may be directly fetched and composed at DPU 540. That is, layer 510, layer 511, and layer 512 may be a certain type of composition (e.g., GPU composition), while layer 513 may be another type of composition (non-GPU composition). After being cached/stored in frame buffer 530, the layer 510, layer 511, and layer 512 may be sent to DPU 540. Further, after processing at DPU 540, the layers 510-513 may be sent to display 550.

Some types of display devices (e.g., mobile devices, computers, TVs, or other consumer devices) may utilize certain types of light emitting diodes (LEDs) in a display (e.g., organic light emitting diodes (OLEDs)). Some types of LEDs (e.g., OLEDs) may have burn-in issues (i.e., pixels retaining a consistently incorrect color due to a prolonged exposure to a certain color) if displaying static bright pixels for some time. For example, static logos, icons, user interface (UI), system UI, and browsers are current key contributors to OLED pixel burn-in. Also, there are a number of current industry anti-burn-in or anti-aging solutions. For instance, anti-burn-in or anti-aging solutions (i.e., solutions for physically decayed pixel/sub-pixels) may randomly shift a few pixels (e.g., 1 or 2 pixels) of those image bright objects during run-time. This may be applicable to certain pixels (e.g., pixels for limited system UI small icons). Additionally, anti-burn-in or anti-aging solutions may record display pixels on-time, compute a decaying factor, and/or apply run-time pixel compensation. This solution may be applicable to all applications and correspond to an improved visual quality. Further, this solution may need a complex run-time compensation/calibration mechanism to balance a display panel visual quality, device power/performance, and anti-burn-in efficiencies. Accordingly, OLED anti-aging is an important issue in the display industry, which may utilize complex run-time compensation.

Figure 6:
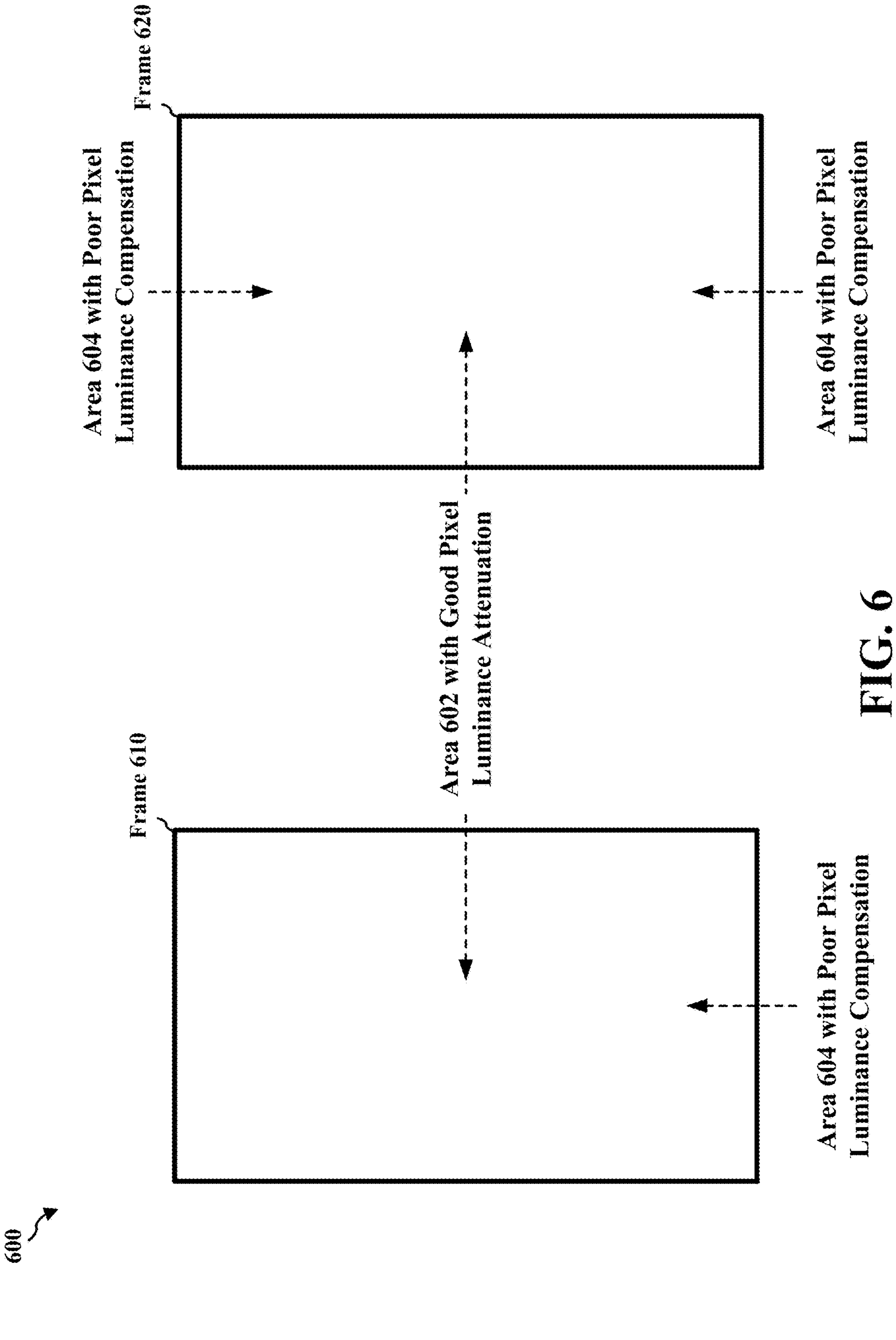
FIG. 6 is a diagram illustrating an example of pixel luminance performance at a display device.

FIG. 6 is a diagram 600 illustrating an example of pixel luminance performance at a display device. More specifically, diagram 600 depicts some display areas that have good pixel luminance attenuation and some display areas that have poor pixel luminance compensation. For instance, diagram 600 depicts frame 610 and frame 620 (i.e., display frames) that have different locations for area 602 with good pixel luminance attenuation and area 604 with poor pixel luminance compensation. As shown in FIG. 6, in frame 610, area 602 with good pixel luminance attenuation is located in the middle of the frame, and area 604 with poor pixel luminance compensation is located in the bottom of the frame. In frame 620, area 602 with good pixel luminance attenuation is located in the middle of the frame, and area 604 with poor pixel luminance compensation is located in the top of the frame and the bottom of the frame. As indicated herein, area 602 with good pixel luminance attenuation corresponds to areas of the frame without burn-in or aging issues for pixels, while area 604 with poor pixel luminance compensation corresponds to areas of the frame with burn-in or aging issues for pixels.

As indicated in FIG. 6, there may be a number of issues with pixel luminance performance at display devices. In order to compensate the physically decayed pixel/sub-pixels, there may be several solutions. For example, the pixels with a low luminance due to decay, or pixels with a fast or high decay rate (i.e., "bad" pixels) may have their luminance boosted. However, this solution may not work for white or bright content images, as certain luminance values (e.g., 255 luminance) may not be able to be boosted to a larger value. This solution may also attenuate all other decent frame pixel luminance to match bad pixels. In some instances, the brightness for pixels with a slow or low decay rate (i.e., "good" pixels) may be attenuated, which means that the panel maximum brightness may be reduced to the "bad" pixel luminance level.

Additionally, in some aspects, the attenuation/reduction of a maximum luminance for pixels in anti-aging solutions may be determined based on the worst decayed pixels. Further, the worse the decaying of the "bad" pixels, the lower the display panel maximum luminance. The display panel maximum luminance may also be a key performance indicator (KPI) and may be important to end users. Moreover, reducing a panel maximum luminance may be a strong limitation to current OLED anti-aging solutions. As such, a panel maximum brightness may be reduced by global anti-aging in order to attenuate "good" pixel values to match "bad" pixels within a frame. Accordingly, it may be beneficial to utilize a regional anti-burn-in or anti-aging solution. For instance, it may be beneficial to make regional adjustments to the luminance of different pixels within certain areas of a frame.

Aspects of the present disclosure may utilize a regional anti-burn-in or anti-aging solution. That is, aspects presented herein may make regional adjustments to the luminance of different pixels within certain areas of a frame. For instance, aspects of the present disclosure may utilize a regional anti-aging or anti-burn-in solution for pixels with a fast or high decay rate (i.e., bad pixels). For example, aspects of the present disclosure may increase the luminance of pixels with a fast or high decay rate. Further, aspects presented herein may attenuate or reduce the luminance of pixels with a slow or low decay rate (i.e., good pixels) to match bad pixels within a local region. In some instances, aspects presented herein may avoid a panel maximum brightness being reduced by pixels with a faster or higher decay rate (i.e., bad pixels) compared to pixels with a slower or lower decay rate (i.e., good pixels). Aspects presented herein may also increase a panel maximum brightness and an average brightness while the anti-aging solution is applied. Further, aspects presented herein may utilize a bad pixel-of-interest basis compensation, which may be more robust for varying decay factors (e.g., real physical panel decay factors) compared with an all-pixel basis solution.

In order to implement regional anti-aging solutions, aspects presented herein may detect static pixels (or sub-pixels) whose decay ratio is fast/high (i.e., bad pixels) or less than a decay ratio threshold. The pixel decay ratio threshold may be obtained by run-time analysis or be pre-configured. For example, a current device pixel luminance decay percentages (or ratios) may be 85-98%. Most of the pixels (e.g., 99% of pixels) may include decay ratios within a certain ratio or percentages (e.g., 96-98%). Also, a few pixels (e.g., less than 1% of pixels) may include decay percentages that are lower than this ratio (e.g., 85%-88%). If the decay percentage of a pixel (or sub-pixel) is less than a certain value (e.g., less than 88%), aspects presented herein may mark the pixel (or sub-pixel) as a bad pixel (or sub-pixel).

Aspects presented herein may also provide a run-time regional anti-aging solution to those regions including bad pixels and ignore other regions (i.e., regions without any bad pixels, or "good" regions). Further, aspects of the present disclosure may perform an analysis of a frame layer stack and a multi-window stack status. Aspects presented herein may also identify local anti-aging compensation regions. For instance, aspects presented herein may identify local anti-aging compensation regions by the following: if multi-window or virtual display or split display is present in a current frame, aspects presented herein may select the specific windows/virtual display that contain a certain region of interest (i.e., a "bad" region) as an anti-aging compensation local region. Aspects presented herein may also select the layers that contain a certain region of interest (i.e., a "bad" region) as an anti-aging compensation local region. Further, aspects presented herein may attenuate the luminance values of "good" pixels to match the luminance values of "bad" pixels. This attenuation process for different pixel luminance values may be performed within certain regions of the frame (e.g., anti-aging compensation local regions).

Additionally, aspects presented herein may identify a region (i.e., a "bad" region) which contains certain pixels of interest (i.e., pixels with a faster or higher decay rate, or "bad" pixels). There may be several of these regions (i.e., "bad" regions) including the pixels of interest ((i.e., pixels with a faster or higher decay rate) within the frame. For instance, there may be two "bad" regions, where one region is in the middle of the frame/panel and another region is in the bottom of the frame/panel. For example, a middle "bad" region of interest may be 911×265 pixels (i.e., width×height of pixels) and a bottom "bad" region of interest may be 221×106 pixels (i.e., width×height of pixels).

Figure 7:
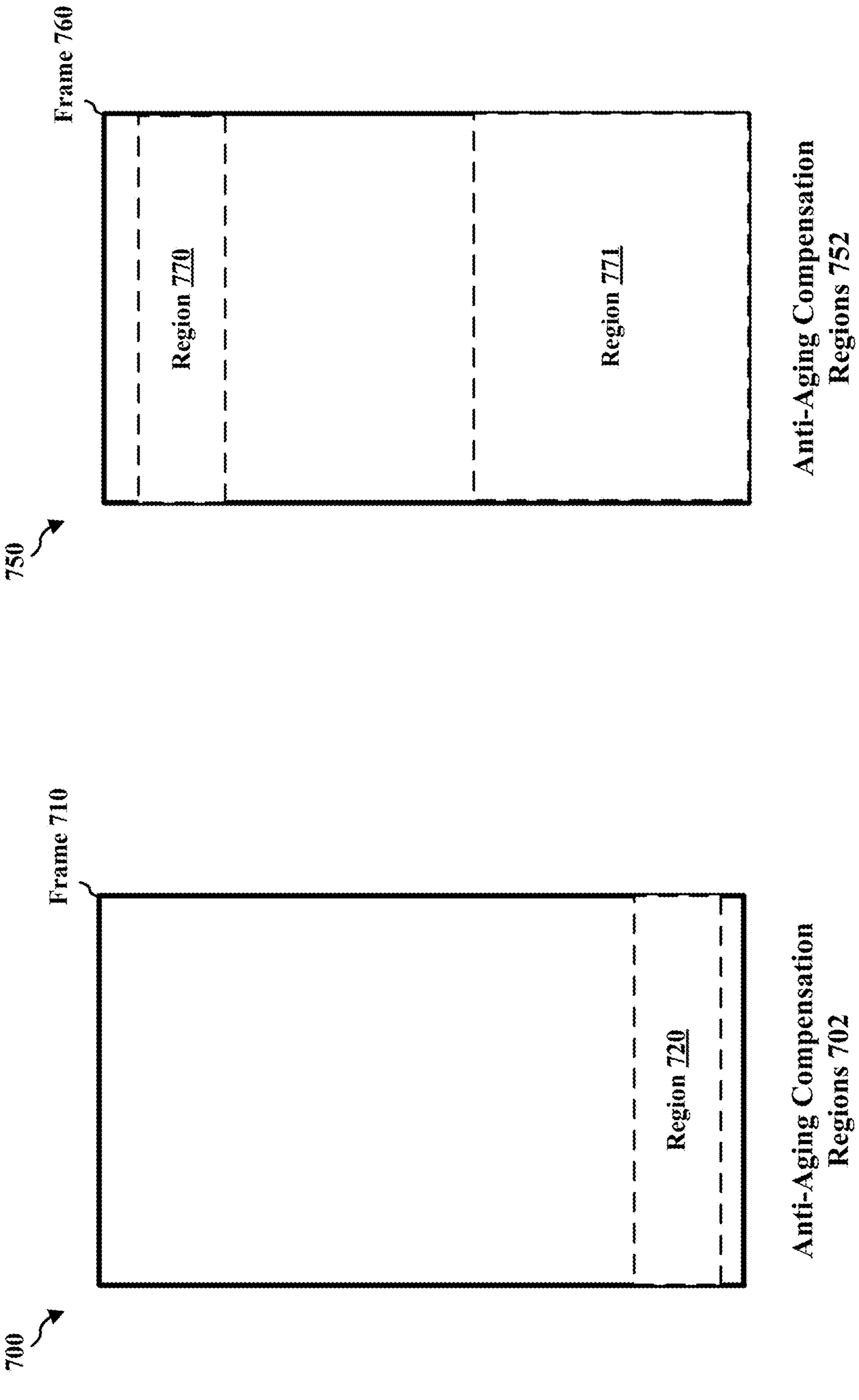
FIG. 7 is a diagram illustrating an example of anti-aging compensation regions at a display.

FIG. 7 includes a diagram 700 and a diagram 750, respectively, illustrating an example of anti-aging compensation regions at a display. More specifically, diagram 700 and diagram 750 depict different regions of pixels used for anti-aging compensation (e.g., anti-aging compensation regions 702 and anti-aging compensation regions 752). As shown in FIG. 7, diagram 700 includes frame 710 that includes region 720 (i.e., a region of pixels that includes a decay ratio that is less than a decay ratio threshold). The region 720 may undergo an anti-aging compensation (i.e., region 720 is a part of anti-aging compensation regions 702). As depicted in FIG. 7, diagram 750 includes frame 760 that includes region 770 and region 771 (i.e., regions of pixels that includes a decay ratio that is less than a decay ratio threshold). Region 770 and region 771 may also undergo an anti-aging compensation (i.e., region 770 and region 771 are part of anti-aging compensation regions 752). The regions 770 and 771 may be identified as including all of the pixels that include a decay ratio that is less than a decay ratio threshold (i.e., pixels with a fast decay rate). This decay ratio threshold may separate the types of pixels in frame 710 and frame 760. For instance, pixels with a fast decay rate (i.e., bad pixels) may include decay ratios that are lower than the decay ratio threshold (i.e., decay ratio of 0.85-0.88). Pixels with a slow decay rate (i.e., good pixels) may include decay ratios that are above the decay ratio threshold (i.e., decay ratio of 0.96-0.98). For example, the decay ratio threshold may be equal to a decay ratio of approximately 0.88-0.92.

In some aspects, if a certain region of interest (i.e., a "bad" pixel region) is spread within the frame or the region is too large (e.g., an "anti-aging compensation local region" is too large), aspects presented herein may not utilize a regional anti-aging solution. For instance, if a certain region of interest (i.e., a "bad" pixel region) is spread within the frame or the region is too large (e.g., an "anti-aging compensation local region" is too large), aspects presented herein may skip the regional anti-aging solution and fall back to conventional frame global anti-aging solutions. The regional and/or global anti-aging strategy may be selected per-application or determined by other device-specific policies during run-time.

As indicated herein, aspects of the present disclosure may include a layer region-of-interest (layer-ROI) basis regional anti-aging and run time strategy. For instance, aspects presented herein may compensate for pixels with a fast or high decay rate (i.e., bad pixels with a decay ratio that is lower than a decay ratio threshold). In some instances, aspects of the present disclosure may compensate for these certain "bad" pixels instead of compensating for all of the pixels in a display. Aspects presented herein may also include a multi-window, layer stack and/or virtual display adaptive regional anti-aging solution. Moreover, aspects presented herein may perform a run-time selection (e.g., a run-time regional vs. global anti-aging run-time selection) and switching strategy. This run-time selection and switching strategy may be based on applications and other configurations.

Figure 8:
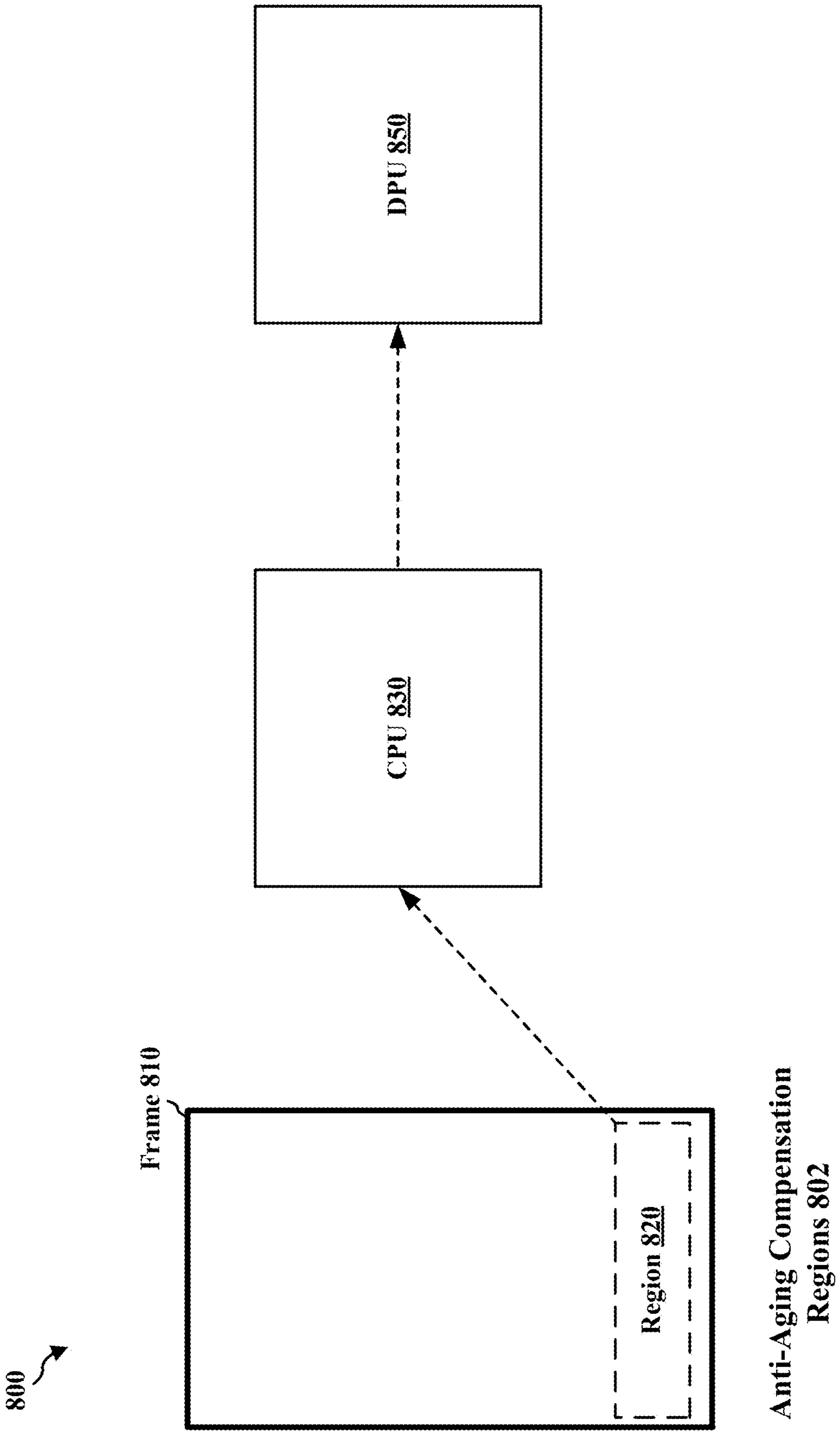
FIG. 8 is a diagram illustrating an example of anti-aging compensation scheme at a display.

FIG. 8 is a diagram 800 illustrating an example of anti-aging compensation scheme for a display device. More specifically, diagram 800 depicts regions of pixels used for anti-aging compensation (e.g., anti-aging compensation regions 802). As shown in FIG. 8, diagram 800 includes frame 810 that includes region 820 (i.e., a region of pixels that includes a decay ratio that is less than a decay ratio threshold), CPU 830, and DPU 850. The region 820 may undergo an anti-aging compensation (i.e., region 820 is a part of anti-aging compensation regions 802). The region 820 may be identified as including all of the pixels that include a decay ratio that is less than a decay ratio threshold (i.e., pixels with a fast decay rate). This decay ratio threshold may separate the types of pixels in frame 810. For instance, pixels with a fast decay rate (i.e., bad pixels) may include decay ratios that are lower than the decay ratio threshold (i.e., decay ratio of 0.85-0.88). Pixels with a slow decay rate (i.e., good pixels) may include decay ratios that are above the decay ratio threshold (i.e., decay ratio of 0.96-0.98). For example, the decay ratio threshold may be equal to a decay ratio of approximately 0.88-0.92. The identification of region 820 may be performed at CPU 830 (e.g., by DPU driver software at CPU 830). The CPU 830 (e.g., DPU driver software at CPU 830) may then increase a brightness value of each of the "bad" pixels in the region 820. CPU 830 may also decrease a brightness value of each of the "good" pixels in the region 820. CPU 830 may then transmit an indication of the increased brightness value or the decreased brightness value to DPU 850.

As shown in FIG. 8, CPU 830 may obtain an indication of frame 810 (e.g., obtain the indication from a GPU) including a set of pixels. CPU 830 may then detect a first subset of pixels in the set of pixels included in the frame 810, where each of the first subset of pixels includes a decay ratio that is less than a decay ratio threshold. CPU 830 may then identify one or more regions (e.g., region 820) of the frame 810 that include all of the first subset of pixels that include a decay ratio that is less than a decay ratio threshold. The first subset of pixels may include pixels with a fast decay rate (i.e., bad pixels) that include decay ratios that are lower than the decay ratio threshold (i.e., a decay ratio of 0.85-0.88). CPU 830 may then increase a brightness value of each of the first subset of pixels in region 820 and/or decrease a brightness value of each of a second subset of pixels in region 820, where each of the second subset of pixels is not included in the first subset of pixels. The second subset of pixels may include pixels with a slow decay rate (i.e., good pixels) that include decay ratios that are above the decay ratio threshold (i.e., a decay ratio of 0.96-0.98). CPU 830 may also mark each of the first subset of pixels that include decay ratios that are lower than the decay ratio threshold (i.e., pixels with a fast decay rate). Additionally, CPU 830 may calculate a set of coordinates for each of the one or more regions (e.g., region 820) of the frame 810 that include all of the first subset of pixels. CPU 830 may then analyze a plurality of windows in the frame 810 based on the set of coordinates for each of the one or more regions (e.g., region 820) of the frame 810 that include all of the first subset of pixels. Moreover, CPU 830 may determine that the one or more regions (e.g., region 820) correspond to an entire area of the frame 810. After this determination, CPU 830 may refrain from increasing the brightness value of each of the first subset of pixels (e.g., "bad" pixels) and/or refrain from decreasing the brightness value of each of the second subset of pixels (e.g., "good" pixels) based on the one or more regions (e.g., region 820) corresponding to the entire area of the frame 810.

Aspects of the present disclosure may include a number of benefits or advantages. Aspects presented herein may make regional adjustments to the luminance of different pixels within certain areas of a frame. For instance, aspects of the present disclosure may utilize a regional anti-aging or anti-burn-in solution for pixels with a fast or high decay rate (i.e., bad pixels). For example, aspects of the present disclosure may increase the luminance of pixels with a fast or high decay rate. Further, aspects presented herein may attenuate or reduce the luminance of pixels with a slow or low decay rate (i.e., good pixels) to match bad pixels within a local region. In some instances, aspects presented herein may avoid a panel maximum brightness being reduced by pixels with a faster or higher decay rate (i.e., bad pixels) compared to pixels with a slower or lower decay rate (i.e., good pixels). Aspects presented herein may also increase a panel maximum brightness and an average brightness while the anti-aging solution is applied. Further, aspects presented herein may utilize a bad pixel-of-interest basis compensation, which may be more robust for varying decay factors (e.g., real physical panel decay factors) compared with an all-pixel basis solution.

Figure 9:
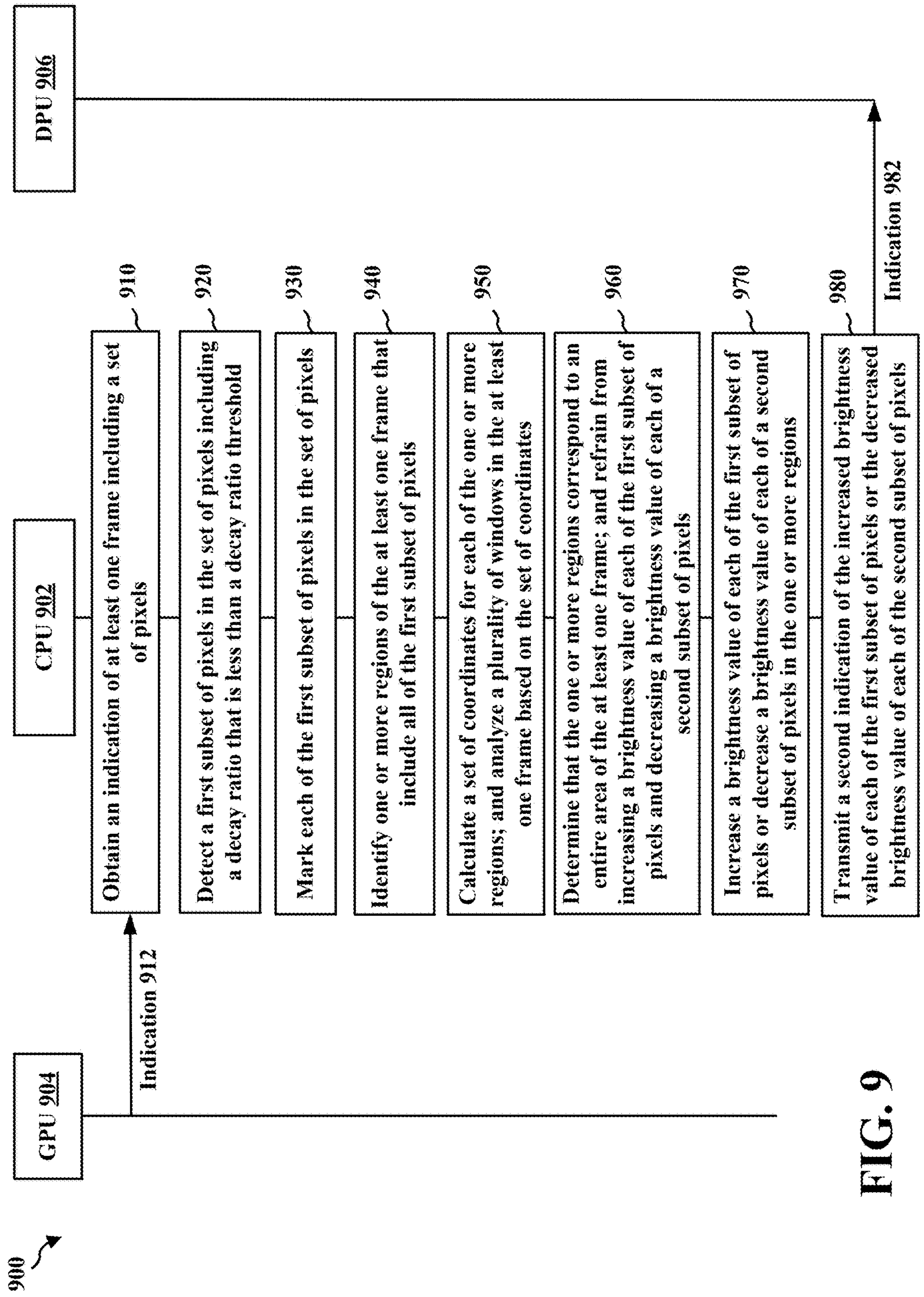
FIG. 9 is a communication flow diagram illustrating example communications between a CPU, a DPU, and a GPU.

FIG. 9 is a communication flow diagram 900 of display processing in accordance with one or more techniques of this disclosure. As shown in FIG. 9, diagram 900 includes example communications between CPU 902 (e.g., a DPU driver, other central processor, or display processor), GPU 904, and DPU 906, in accordance with one or more techniques of this disclosure.

At 910, CPU 902 may obtain an indication of at least one frame associated with display processing (e.g., CPU 902 may obtain indication 912 from GPU 904), where the at least one frame includes a set of pixels, where the at least one frame is associated with at least one layer.

At 920, CPU 902 may detect a first subset of pixels in the set of pixels included in the at least one frame, where each of the first subset of pixels includes a decay ratio that is less than a decay ratio threshold. In some instances, the decay ratio threshold may correspond to a list of decay ratios for all of the set of pixels included in the at least one frame, and the list of decay ratios may be ordered based on an increasing value of the decay ratios for each of the set of pixels or a decreasing value of the decay ratios for each of the set of pixels.

At 930, CPU 902 may mark each of the first subset of pixels in the set of pixels, where each of the first subset of pixels includes the decay ratio that is less than the decay ratio threshold. In some aspects, the decay ratio threshold may be obtained via a run-time analysis, and/or the decay ratio threshold may be preconfigured.

At 940, CPU 902 may identify one or more regions of the at least one frame that include all of the first subset of pixels. The one or more regions may correspond to one or more anti-aging compensation regions. Additionally, the one or more regions may include a first region and a second region, where the first region and the second region together include all of the first subset of pixels. In some instances, the one or more regions of the at least one frame that include all of the first subset of pixels may be identified based on at least one other application or a preconfiguration. In some aspects, the one or more regions of the at least one frame that include all of the first subset of pixels may be identified by at least one of: a display processing unit (DPU) driver, a central processing unit (CPU), DPU driver software, a DPU, a display driver, or display driver software.

At 950, CPU 902 may calculate a set of coordinates for each of the one or more regions of the at least one frame that include all of the first subset of pixels.

Also, at 950, CPU 902 may analyze a plurality of windows in the at least one frame based on the set of coordinates for each of the one or more regions of the at least one frame that include all of the first subset of pixels.

At 960, CPU 902 may determine that the one or more regions correspond to an entire area of the at least one frame.

Also, at 960, CPU 902 may refrain from increasing the brightness value of each of the first subset of pixels and refrain from decreasing the brightness value of each of the second subset of pixels based on the one or more regions corresponding to the entire area of the at least one frame.

At 970, CPU 902 may increase a brightness value of each of the first subset of pixels in the one or more regions and/or decrease a brightness value of each of a second subset of pixels in the one or more regions, where each of the second subset of pixels is not included in the first subset of pixels. In some aspects, increasing the brightness value of each of the first subset of pixels or decreasing the brightness value of each of the second subset of pixels may include: mitigating a difference in the brightness value of each of the second subset of pixels and the brightness value of each of the first subset of pixels. Accordingly, the CPU may mitigate a difference in the brightness value of each of the second subset of pixels and the brightness value of each of the first subset of pixels. Each of the second subset of pixels may include the decay ratio that is greater than the decay ratio threshold, and the decay ratio that is greater than the decay ratio threshold may correspond to a pixel that is less likely to decay compared to a pixel including the decay ratio that is less than the decay ratio threshold. In some instances, the brightness value of each of the first subset of pixels may be increased at a same time that the brightness value of each of the second subset of pixels is decreased.

At 980, CPU 902 may transmit a second indication of the increased brightness value of each of the first subset of pixels in the one or more regions or the decreased brightness value of each of the second subset of pixels in the one or more regions (e.g., CPU 902 may transmit indication 982 to DPU 906).

Figure 10:
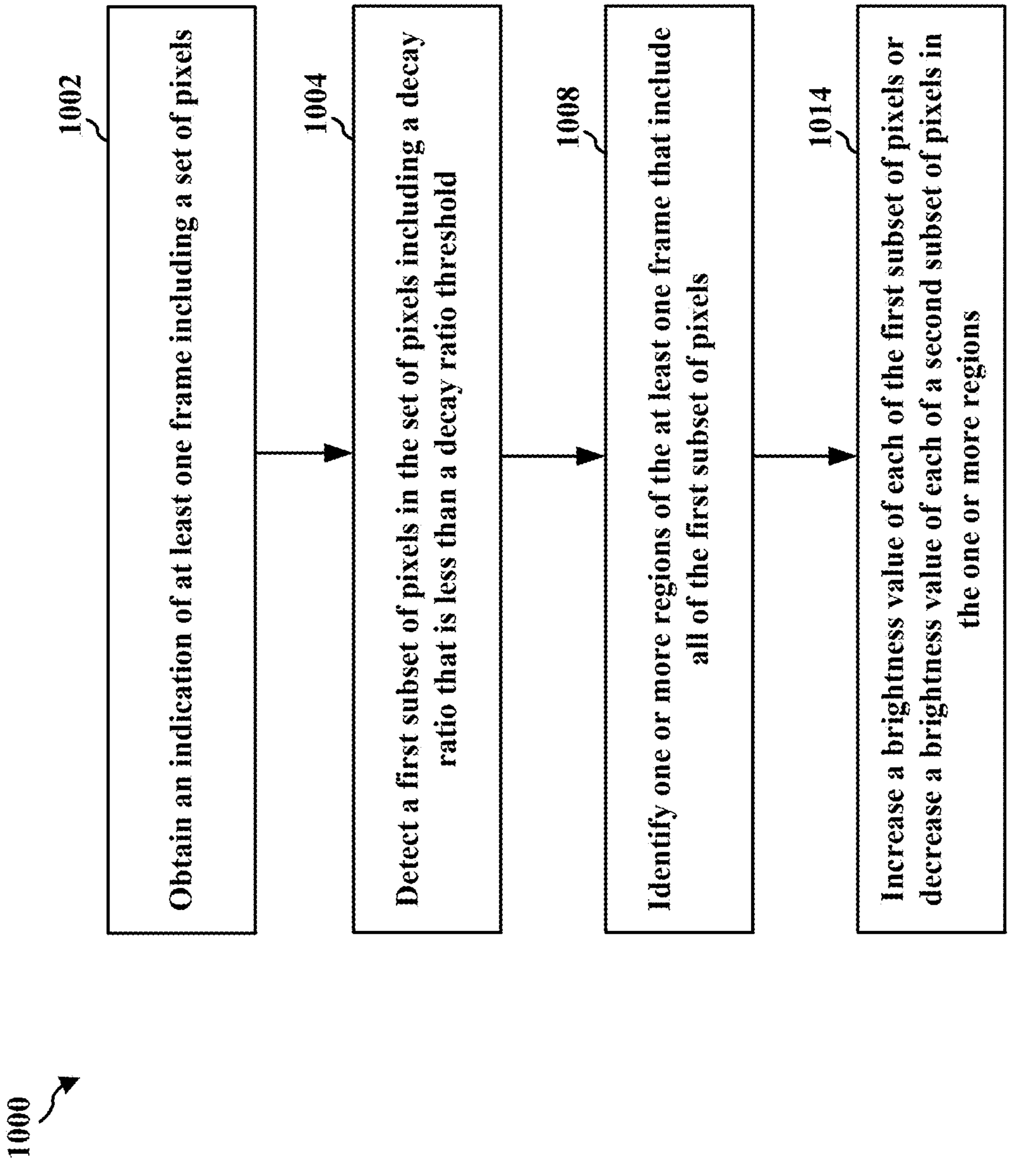
FIG. 10 is a flowchart of an example method of display processing.

FIG. 10 is a flowchart 1000 of an example method of display processing in accordance with one or more techniques of this disclosure. The method may be performed by a CPU (or other central processor), a DPU driver, a DPU (or other display processor), a GPU (or other graphics processor), a DDIC, an apparatus for display processing, a wireless communication device, and/or any apparatus that may perform display processing as used in connection with the examples of FIGS. 1-9.

At 1002, the CPU may obtain an indication of at least one frame associated with display processing, where the at least one frame includes a set of pixels, where the at least one frame is associated with at least one layer, as described in connection with the examples in FIGS. 1-9. For example, as described in 910 of FIG. 9, CPU 902 may obtain an indication of at least one frame associated with display processing, where the at least one frame includes a set of pixels, where the at least one frame is associated with at least one layer. Further, step 1002 may be performed by display processor 127 in FIG. 1.

At 1004, the CPU may detect a first subset of pixels in the set of pixels included in the at least one frame, where each of the first subset of pixels includes a decay ratio that is less than a decay ratio threshold, as described in connection with the examples in FIGS. 1-9. For example, as described in 920 of FIG. 9, CPU 902 may detect a first subset of pixels in the set of pixels included in the at least one frame, where each of the first subset of pixels includes a decay ratio that is less than a decay ratio threshold. Further, step 1004 may be performed by display processor 127 in FIG. 1. In some instances, the decay ratio threshold may correspond to a list of decay ratios for all of the set of pixels included in the at least one frame, and the list of decay ratios may be ordered based on an increasing value of the decay ratios for each of the set of pixels or a decreasing value of the decay ratios for each of the set of pixels.

At 1008, the CPU may identify one or more regions of the at least one frame that include all of the first subset of pixels, as described in connection with the examples in FIGS. 1-9. For example, as described in 940 of FIG. 9, CPU 902 may identify one or more regions of the at least one frame that include all of the first subset of pixels. Further, step 1008 may be performed by display processor 127 in FIG. 1. The one or more regions may correspond to one or more anti-aging compensation regions. Additionally, the one or more regions may include a first region and a second region, where the first region and the second region together include all of the first subset of pixels. In some instances, the one or more regions of the at least one frame that include all of the first subset of pixels may be identified based on at least one other application or a preconfiguration. In some aspects, the one or more regions of the at least one frame that include all of the first subset of pixels may be identified by at least one of: a display processing unit (DPU) driver, a central processing unit (CPU), DPU driver software, a DPU, a display driver, or display driver software.

At 1014, the CPU may increase a brightness value of each of the first subset of pixels in the one or more regions and/or decrease a brightness value of each of a second subset of pixels in the one or more regions, where each of the second subset of pixels is not included in the first subset of pixels, as described in connection with the examples in FIGS. 1-9. For example, as described in 970 of FIG. 9, CPU 902 may increase a brightness value of each of the first subset of pixels in the one or more regions and/or decrease a brightness value of each of a second subset of pixels in the one or more regions, where each of the second subset of pixels is not included in the first subset of pixels. Further, step 1014 may be performed by display processor 127 in FIG. 1. In some aspects, increasing the brightness value of each of the first subset of pixels or decreasing the brightness value of each of the second subset of pixels may include: mitigating a difference in the brightness value of each of the second subset of pixels and the brightness value of each of the first subset of pixels. Accordingly, the CPU may mitigate a difference in the brightness value of each of the second subset of pixels and the brightness value of each of the first subset of pixels. Each of the second subset of pixels may include the decay ratio that is greater than the decay ratio threshold, and the decay ratio that is greater than the decay ratio threshold may correspond to a pixel that is less likely to decay compared to a pixel including the decay ratio that is less than the decay ratio threshold. In some instances, the brightness value of each of the first subset of pixels may be increased at a same time that the brightness value of each of the second subset of pixels is decreased.

Figure 11:
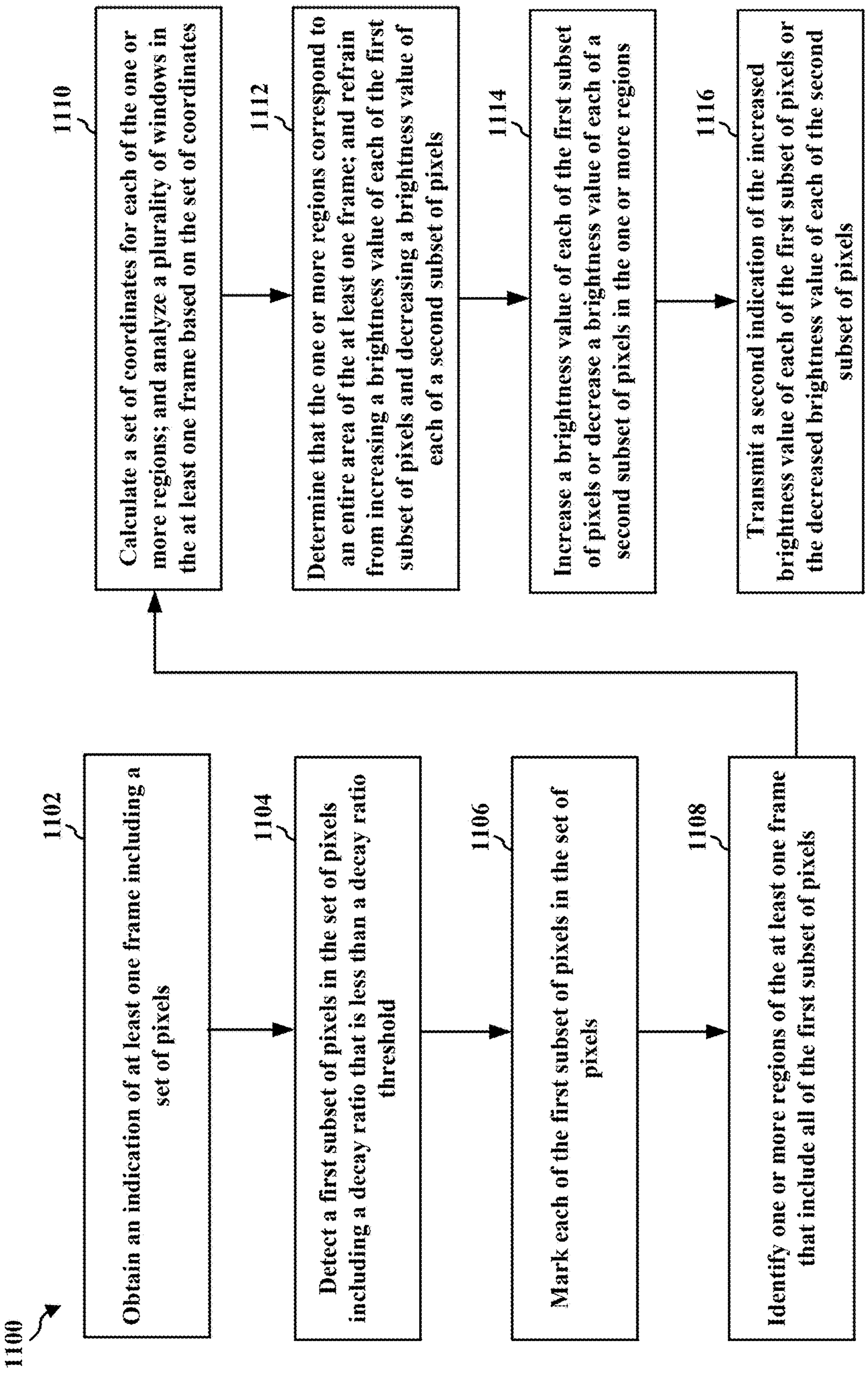
FIG. 11 is a flowchart of an example method of display processing.

FIG. 11 is a flowchart 1100 of an example method of display processing in accordance with one or more techniques of this disclosure. The method may be performed by a CPU (or other central processor), a DPU driver, a DPU (or other display processor), a GPU (or other graphics processor), a DDIC, an apparatus for display processing, a wireless communication device, and/or any apparatus that may perform display processing as used in connection with the examples of FIGS. 1-9.

At 1102, the CPU may obtain an indication of at least one frame associated with display processing, where the at least one frame includes a set of pixels, where the at least one frame is associated with at least one layer, as described in connection with the examples in FIGS. 1-9. For example, as described in 910 of FIG. 9, CPU 902 may obtain an indication of at least one frame associated with display processing, where the at least one frame includes a set of pixels, where the at least one frame is associated with at least one layer. Further, step 1102 may be performed by display processor 127 in FIG. 1.

At 1104, the CPU may detect a first subset of pixels in the set of pixels included in the at least one frame, where each of the first subset of pixels includes a decay ratio that is less than a decay ratio threshold, as described in connection with the examples in FIGS. 1-9. For example, as described in 920 of FIG. 9, CPU 902 may detect a first subset of pixels in the set of pixels included in the at least one frame, where each of the first subset of pixels includes a decay ratio that is less than a decay ratio threshold. Further, step 1104 may be performed by display processor 127 in FIG. 1. In some instances, the decay ratio threshold may correspond to a list of decay ratios for all of the set of pixels included in the at least one frame, and the list of decay ratios may be ordered based on an increasing value of the decay ratios for each of the set of pixels or a decreasing value of the decay ratios for each of the set of pixels.

At 1106, the CPU may mark each of the first subset of pixels in the set of pixels, where each of the first subset of pixels includes the decay ratio that is less than the decay ratio threshold, as described in connection with the examples in FIGS. 1-9. For example, as described in 930 of FIG. 9, CPU 902 may mark each of the first subset of pixels in the set of pixels, where each of the first subset of pixels includes the decay ratio that is less than the decay ratio threshold. Further, step 1106 may be performed by display processor 127 in FIG. 1. In some aspects, the decay ratio threshold may be obtained via a run-time analysis, and/or the decay ratio threshold may be preconfigured.

At 1108, the CPU may identify one or more regions of the at least one frame that include all of the first subset of pixels, as described in connection with the examples in FIGS. 1-9. For example, as described in 940 of FIG. 9, CPU 902 may identify one or more regions of the at least one frame that include all of the first subset of pixels. Further, step 1108 may be performed by display processor 127 in FIG. 1. The one or more regions may correspond to one or more anti-aging compensation regions. Additionally, the one or more regions may include a first region and a second region, where the first region and the second region together include all of the first subset of pixels. In some instances, the one or more regions of the at least one frame that include all of the first subset of pixels may be identified based on at least one other application or a preconfiguration. In some aspects, the one or more regions of the at least one frame that include all of the first subset of pixels may be identified by at least one of: a display processing unit (DPU) driver, a central processing unit (CPU), DPU driver software, a DPU, a display driver, or display driver software.

At 1110, the CPU may calculate a set of coordinates for each of the one or more regions of the at least one frame that include all of the first subset of pixels, as described in connection with the examples in FIGS. 1-9. For example, as described in 950 of FIG. 9, CPU 902 may calculate a set of coordinates for each of the one or more regions of the at least one frame that include all of the first subset of pixels. Further, step 1110 may be performed by display processor 127 in FIG. 1.

Also, at 1110, the CPU may analyze a plurality of windows in the at least one frame based on the set of coordinates for each of the one or more regions of the at least one frame that include all of the first subset of pixels, as described in connection with the examples in FIGS. 1-9. For example, as described in 950 of FIG. 9, CPU 902 may analyze a plurality of windows in the at least one frame based on the set of coordinates for each of the one or more regions of the at least one frame that include all of the first subset of pixels. Further, step 1110 may be performed by display processor 127 in FIG. 1.

At 1112, the CPU may determine that the one or more regions correspond to an entire area of the at least one frame, as described in connection with the examples in FIGS. 1-9. For example, as described in 960 of FIG. 9, CPU 902 may determine that the one or more regions correspond to an entire area of the at least one frame. Further, step 1112 may be performed by display processor 127 in FIG. 1.

Also, at 1112, the CPU may refrain from increasing the brightness value of each of the first subset of pixels and refrain from decreasing the brightness value of each of the second subset of pixels based on the one or more regions corresponding to the entire area of the at least one frame, as described in connection with the examples in FIGS. 1-9. For example, as described in 960 of FIG. 9, CPU 902 may refrain from increasing the brightness value of each of the first subset of pixels and refrain from decreasing the brightness value of each of the second subset of pixels based on the one or more regions corresponding to the entire area of the at least one frame. Further, step 1112 may be performed by display processor 127 in FIG. 1.

At 1114, the CPU may increase a brightness value of each of the first subset of pixels in the one or more regions and/or decrease a brightness value of each of a second subset of pixels in the one or more regions, where each of the second subset of pixels is not included in the first subset of pixels, as described in connection with the examples in FIGS. 1-9. For example, as described in 970 of FIG. 9, CPU 902 may increase a brightness value of each of the first subset of pixels in the one or more regions and/or decrease a brightness value of each of a second subset of pixels in the one or more regions, where each of the second subset of pixels is not included in the first subset of pixels. Further, step 1114 may be performed by display processor 127 in FIG. 1. In some aspects, increasing the brightness value of each of the first subset of pixels or decreasing the brightness value of each of the second subset of pixels may include: mitigating a difference in the brightness value of each of the second subset of pixels and the brightness value of each of the first subset of pixels. Accordingly, the CPU may mitigate a difference in the brightness value of each of the second subset of pixels and the brightness value of each of the first subset of pixels. Each of the second subset of pixels may include the decay ratio that is greater than the decay ratio threshold, and the decay ratio that is greater than the decay ratio threshold may correspond to a pixel that is less likely to decay compared to a pixel including the decay ratio that is less than the decay ratio threshold. In some instances, the brightness value of each of the first subset of pixels may be increased at a same time that the brightness value of each of the second subset of pixels is decreased.

At 1116, the CPU may transmit a second indication of the increased brightness value of each of the first subset of pixels in the one or more regions or the decreased brightness value of each of the second subset of pixels in the one or more regions, as described in connection with the examples in FIGS. 1-9. For example, as described in 980 of FIG. 9, CPU 902 may transmit a second indication of the increased brightness value of each of the first subset of pixels in the one or more regions or the decreased brightness value of each of the second subset of pixels in the one or more regions. Further, step 1116 may be performed by display processor 127 in FIG. 1.

In configurations, a method or an apparatus for display processing is provided. The apparatus may be a CPU (or other central processor), a DPU (or other display processor), a GPU (or other graphics processor), a DPU driver, a DDIC, an apparatus for display processing, and/or some other processor that may perform display processing. In aspects, the apparatus may be the display processor 127 within the device 104, or may be some other hardware within the device 104 or another device. The apparatus, e.g., display processor 127, may include means for obtaining an indication of at least one frame associated with the display processing, where the at least one frame includes a set of pixels, where the at least one frame is associated with at least one layer. The apparatus, e.g., display processor 127, may also include means for detecting a first subset of pixels in the set of pixels included in the at least one frame, where each of the first subset of pixels includes a decay ratio that is less than a decay ratio threshold. The apparatus, e.g., display processor 127, may also include means for identifying one or more regions of the at least one frame that include all of the first subset of pixels. The apparatus, e.g., display processor 127, may also include means for increasing a brightness value of each of the first subset of pixels in the one or more regions and/or means for decreasing a brightness value of each of a second subset of pixels in the one or more regions, where each of the second subset of pixels is not included in the first subset of pixels. The apparatus, e.g., display processor 127, may also include means for calculating a set of coordinates for each of the one or more regions of the at least one frame that include all of the first subset of pixels. The apparatus, e.g., display processor 127, may also include means for analyzing a plurality of windows in the at least one frame based on the set of coordinates for each of the one or more regions of the at least one frame that include all of the first subset of pixels. The apparatus, e.g., display processor 127, may also include means for determining that the one or more regions correspond to an entire area of the at least one frame. The apparatus, e.g., display processor 127, may also include means for refraining from increasing the brightness value of each of the first subset of pixels and means for refraining from decreasing the brightness value of each of the second subset of pixels based on the one or more regions corresponding to the entire area of the at least one frame. The apparatus, e.g., display processor 127, may also include means for marking each of the first subset of pixels in the set of pixels, where each of the first subset of pixels includes the decay ratio that is less than the decay ratio threshold. The apparatus, e.g., display processor 127, may also include means for transmitting a second indication of the increased brightness value of each of the first subset of pixels in the one or more regions or the decreased brightness value of each of the second subset of pixels in the one or more regions.

The subject matter described herein may be implemented to realize one or more benefits or advantages. For instance, the described display processing techniques may be used by a CPU, a central processor, a DPU driver, a DPU, a display processor, a GPU, or some other processor that may perform display processing to implement the anti-aging regional compensation techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize anti-aging regional compensation techniques in order to improve memory bandwidth efficiency and/or increase processing speed at a CPU, a DPU or a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "least one of A, B, and C," "one or more of A, B, and C," and "A, B, C, or any combination thereof"

include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing, including a memory and at least one processor coupled to the memory and, based at least in part on information stored in the memory, the at least one processor is configured to: obtain an indication of at least one frame associated with the display processing, where the at least one frame includes a set of pixels, where the at least one frame is associated with at least one layer; detect a first subset of pixels in the set of pixels included in the at least one frame, where each of the first subset of pixels includes a decay ratio that is less than a decay ratio threshold; identify one or more regions of the at least one frame that include all of the first subset of pixels; and increase a brightness value of each of the first subset of pixels in the one or more regions or decrease a brightness value of each of a second subset of pixels in the one or more regions, where each of the second subset of pixels is not included in the first subset of pixels.

Aspect 2 is the apparatus of aspect 1, where the at least one processor is further configured to: calculate a set of coordinates for each of the one or more regions of the at least one frame that include all of the first subset of pixels.

Aspect 3 is the apparatus of aspect 2, where the at least one processor is further configured to: analyze a plurality of windows in the at least one frame based on the set of coordinates for each of the one or more regions of the at least one frame that include all of the first subset of pixels.

Aspect 4 is the apparatus of any of aspects 1 to 3, where the at least one processor is further configured to: determine that the one or more regions correspond to an entire area of the at least one frame; and refrain from increasing the brightness value of each of the first subset of pixels and refrain from decreasing the brightness value of each of the second subset of pixels based on the one or more regions corresponding to the entire area of the at least one frame.

Aspect 5 is the apparatus of any of aspects 1 to 4, where to increase the brightness value of each of the first subset of pixels or decrease the brightness value of each of the second subset of pixels, the at least one processor is configured to: mitigate a difference in the brightness value of each of the second subset of pixels and the brightness value of each of the first subset of pixels.

Aspect 6 is the apparatus of any of aspects 1 to 5, where each of the second subset of pixels includes the decay ratio that is greater than the decay ratio threshold, and where the decay ratio that is greater than the decay ratio threshold corresponds to a pixel that is less likely to decay compared to a pixel including the decay ratio that is less than the decay ratio threshold.

Aspect 7 is the apparatus of any of aspects 1 to 6, where the at least one processor is further configured to: mark each of the first subset of pixels in the set of pixels, where each of the first subset of pixels includes the decay ratio that is less than the decay ratio threshold.

Aspect 8 is the apparatus of any of aspects 1 to 7, where the decay ratio threshold corresponds to a list of decay ratios for all of the set of pixels included in the at least one frame, and where the list of decay ratios is ordered based on an increasing value of the decay ratios for each of the set of pixels or a decreasing value of the decay ratios for each of the set of pixels.

Aspect 9 is the apparatus of any of aspects 1 to 8, where the brightness value of each of the first subset of pixels is increased at a same time that the brightness value of each of the second subset of pixels is decreased.

Aspect 10 is the apparatus of any of aspects 1 to 9, where the at least one processor is further configured to: transmit a second indication of the increased brightness value of each of the first subset of pixels in the one or more regions or the decreased brightness value of each of the second subset of pixels in the one or more regions.

Aspect 11 is the apparatus of any of aspects 1 to 10, where the one or more regions correspond to one or more anti-aging compensation regions.

Aspect 12 is the apparatus of any of aspects 1 to 11, where the one or more regions include a first region and a second region, where the first region and the second region together include all of the first subset of pixels.

Aspect 13 is the apparatus of any of aspects 1 to 12, where the decay ratio threshold is obtained via a run-time analysis, or where the decay ratio threshold is preconfigured.

Aspect 14 is the apparatus of any of aspects 1 to 13, where the one or more regions of the at least one frame that include all of the first subset of pixels are identified based on at least one other application or a preconfiguration.

Aspect 15 is the apparatus of any of aspects 1 to 14, where the one or more regions of the at least one frame that include all of the first subset of pixels are identified by at least one of: a display processing unit (DPU) driver, a central processing unit (CPU), DPU driver software, a DPU, a display driver, or display driver software.

Aspect 16 is the apparatus of any of aspects 1 to 15, where the apparatus is a wireless communication device, further including at least one of an antenna or a transceiver coupled to the at least one processor, where the at least one processor is configured to obtain the indication of the at least one frame via at least one of the antenna or the transceiver.

Aspect 17 is a method of display processing for implementing any of aspects 1 to 16.

Aspect 18 is an apparatus for display processing including means for implementing any of aspects 1 to 16.

Aspect 19 is a computer-readable medium (e.g., a non-transitory computer-readable medium) storing computer executable code, the code when executed by at least one processor causes the at least one processor to implement any of aspects 1 to 16.

What is claimed is:

1. An apparatus for display processing, comprising:

memory; and at least one processor coupled to the memory and, based at least in part on information stored in the memory, the at least one processor is configured to:

obtain an indication of at least one frame associated with the display processing, wherein the at least one frame includes a set of pixels, wherein the at least one frame is associated with at least one layer;

detect a first subset of pixels in the set of pixels included in the at least one frame, wherein each of the first subset of pixels includes a decay ratio that is less than a decay ratio threshold, wherein the decay ratio threshold corresponds to a list of decay ratios for all of the set of pixels included in the at least one frame, and wherein the list of decay ratios is ordered based on an increasing value of decay ratios for each of the set of pixels or a decreasing value of the decay ratios for each of the set of pixels;

identify one or more regions of the at least one frame that include all of the first subset of pixels; and increase a brightness value of each of the first subset of pixels in the one or more regions or decrease a brightness value of each of a second subset of pixels in the one or more regions, wherein each of the second subset of pixels is not included in the first subset of pixels.

2. The apparatus of claim 1, wherein the at least one processor is configured to:

calculate a set of coordinates for each of the one or more regions of the at least one frame that include all of the first subset of pixels.

3. The apparatus of claim 2, wherein the at least one processor is configured to:

analyze a plurality of windows in the at least one frame based on the set of coordinates for each of the one or more regions of the at least one frame that include all of the first subset of pixels.

4. The apparatus of claim 1, wherein the at least one processor is configured to:

determine that the one or more regions correspond to an entire area of the at least one frame; and refrain from increasing the brightness value of each of the first subset of pixels and refrain from decreasing the brightness value of each of the second subset of pixels based on the one or more regions corresponding to the entire area of the at least one frame.

5. The apparatus of claim 1, wherein to increase the brightness value of each of the first subset of pixels or decrease the brightness value of each of the second subset of pixels, the at least one processor is configured to: mitigate a difference in the brightness value of each of the second subset of pixels and the brightness value of each of the first subset of pixels.

6. The apparatus of claim 1, wherein each of the second subset of pixels includes the decay ratio that is greater than the decay ratio threshold, and wherein the decay ratio that is greater than the decay ratio threshold corresponds to a pixel that is less likely to decay compared to a pixel including the decay ratio that is less than the decay ratio threshold.

7. The apparatus of claim 1, wherein the at least one processor is configured to:

mark each of the first subset of pixels in the set of pixels, wherein each of the first subset of pixels includes the decay ratio that is less than the decay ratio threshold.

8. The apparatus of claim 1, wherein the brightness value of each of the first subset of pixels is increased at a same time that the brightness value of each of the second subset of pixels is decreased.

9. The apparatus of claim 1, wherein the at least one processor is configured to:

transmit a second indication of the increased brightness value of each of the first subset of pixels in the one or more regions or the decreased brightness value of each of the second subset of pixels in the one or more regions.

10. The apparatus of claim 1, wherein the one or more regions correspond to one or more anti-aging compensation regions.

11. The apparatus of claim 1, wherein the one or more regions include a first region and a second region, wherein the first region and the second region together include all of the first subset of pixels.

12. The apparatus of claim 1, wherein the decay ratio threshold is obtained via a run-time analysis, or wherein the decay ratio threshold is preconfigured.

13. The apparatus of claim 1, wherein the one or more regions of the at least one frame that include all of the first subset of pixels are identified based on at least one other application or a preconfiguration.

14. The apparatus of claim 1, further comprising at least one of an antenna or a transceiver coupled to the at least one processor, wherein the at least one processor is configured to obtain the indication of the at least one frame via at least one of the antenna or the transceiver, and wherein the one or more regions of the at least one frame that include all of the first subset of pixels are identified by at least one of: a display processing unit (DPU) driver, a central processing unit (CPU), DPU driver software, a DPU, a display driver, or display driver software.

15. A method of display processing, comprising:

obtaining an indication of at least one frame associated with the display processing, wherein the at least one frame includes a set of pixels, wherein the at least one frame is associated with at least one layer;

detecting a first subset of pixels in the set of pixels included in the at least one frame, wherein each of the first subset of pixels includes a decay ratio that is less than a decay ratio threshold, wherein the decay ratio threshold corresponds to a list of decay ratios for all of the set of pixels included in the at least one frame, and wherein the list of decay ratios is ordered based on an increasing value of decay ratios for each of the set of pixels or a decreasing value of the decay ratios for each of the set of pixels;

identifying one or more regions of the at least one frame that include all of the first subset of pixels; and increasing a brightness value of each of the first subset of pixels in the one or more regions or decreasing a brightness value of each of a second subset of pixels in the one or more regions, wherein each of the second subset of pixels is not included in the first subset of pixels.

16. The method of claim 15, further comprising:

calculating a set of coordinates for each of the one or more regions of the at least one frame that include all of the first subset of pixels.

17. The method of claim 16, further comprising:

analyzing a plurality of windows in the at least one frame based on the set of coordinates for each of the one or more regions of the at least one frame that include all of the first subset of pixels.

18. The method of claim 15, further comprising:

determining that the one or more regions correspond to an entire area of the at least one frame; and refraining from increasing the brightness value of each of the first subset of pixels and refraining from decreasing the brightness value of each of the second subset of pixels based on the one or more regions corresponding to the entire area of the at least one frame.

19. The method of claim 15, wherein increasing the brightness value of each of the first subset of pixels or decreasing the brightness value of each of the second subset of pixels comprises: mitigating a difference in the brightness value of each of the second subset of pixels and the brightness value of each of the first subset of pixels.

20. A non-transitory computer-readable medium storing computer executable code for display processing, the code when executed by a processor causes the processor to:

obtain an indication of at least one frame associated with the display processing, wherein the at least one frame includes a set of pixels, wherein the at least one frame is associated with at least one layer;

detect a first subset of pixels in the set of pixels included in the at least one frame, wherein each of the first subset of pixels includes a decay ratio that is less than a decay ratio threshold, wherein the decay ratio threshold corresponds to a list of decay ratios for all of the set of pixels included in the at least one frame, and wherein the list of decay ratios is ordered based on an increasing value of decay ratios for each of the set of pixels or a decreasing value of the decay ratios for each of the set of pixels;

identify one or more regions of the at least one frame that include all of the first subset of pixels; and increase a brightness value of each of the first subset of pixels in the one or more regions or decrease a brightness value of each of a second subset of pixels in the one or more regions, wherein each of the second subset of pixels is not included in the first subset of pixels.

* * * * *